United States Patent [19]

Wales et al.

[11] Patent Number: 4,851,616
[45] Date of Patent: Jul. 25, 1989

[54] TOUCH SCREEN INPUT SYSTEM

[76] Inventors: R. Langdon Wales, Moccasin Hill, Lincoln, Mass. 01773; H. W. Crowley, 310 Parker, Newton, Mass. 02159

[21] Appl. No.: 816,065

[22] Filed: Jan. 3, 1966

[51] Int. Cl.$^4$ .............................................. G08C 21/00
[52] U.S. Cl. ....................................... 178/18; 178/19; 250/221; 340/718
[58] Field of Search ................... 178/18, 19; 250/221, 250/491.1, 598, 215, 222.1, 549, 203 CT; 340/815.15, 707, 708, 716, 718; 382/13

[56] References Cited

U.S. PATENT DOCUMENTS

| 3,394,366 | 7/1968 | Dye ........................................ 178/18 |
| 3,443,075 | 5/1969 | Gloess ................................... 178/18 |
| 3,613,066 | 10/1971 | Cooreman ............................. 178/18 |
| 4,277,783 | 7/1981 | Samoieri et al. .................... 340/708 |
| 4,305,071 | 12/1981 | Bell et al. ............................ 340/712 |
| 4,346,376 | 8/1982 | Mallow ................................. 340/712 |
| 4,484,179 | 11/1984 | Kasday ............................. 340/365 P |
| 4,517,559 | 5/1985 | Deitch et al. ...................... 178/18 X |
| 4,542,375 | 9/1985 | Alles et al. ......................... 340/712 |
| 4,613,987 | 9/1986 | Keverian ............................... 382/65 |

Primary Examiner—Stafford D. Schreyer
Attorney, Agent, or Firm—Wolf, Greenfield & Sacks

[57] ABSTRACT

A touch screen input system for use with a display screen having a photo-active display surface including a controllable sweeping beam. The system includes at least one photo-detector in combination with detection circuitry for continuously registering the position of the beam in the display surface. A pointer is adapted to reflect light from the beam to the photo-detector to provide a latch signal which is used to hold a signal identifying display screen location corresponding to pointer means location.

29 Claims, 2 Drawing Sheets

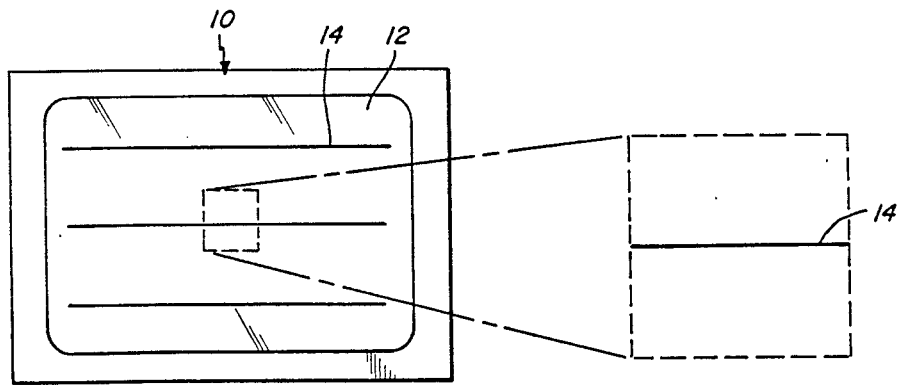
Fig. 1 SCAN SIGNAL
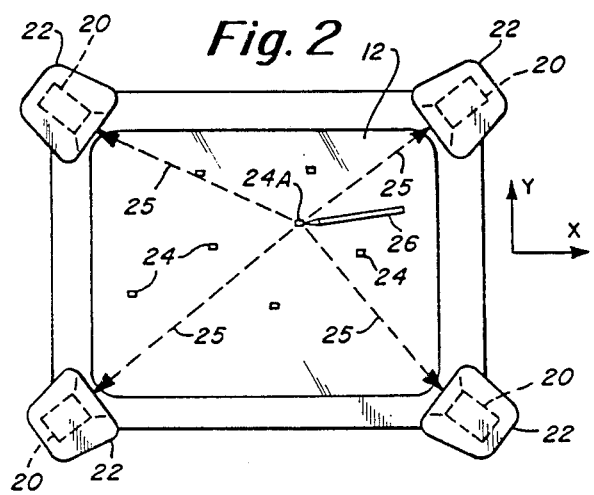
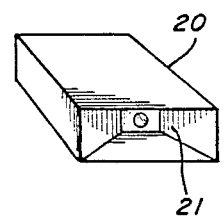
Fig. 3
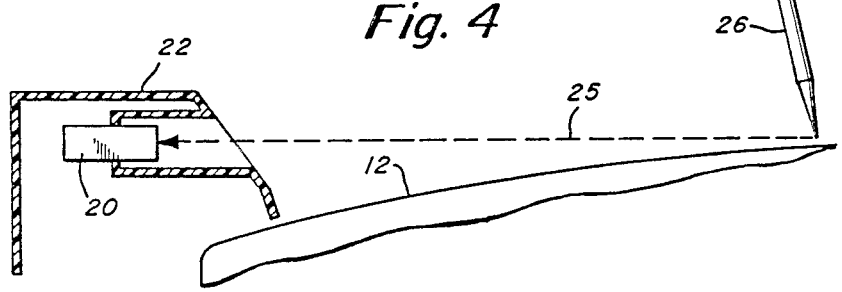
Fig. 4

TOUCH SCREEN INPUT SYSTEM

BACKGROUND OF THE INVENTION

The present invention relates in general to a touch screen input system. More particularly, the invention relates to a novel technique for detecting the location of an object and in particular, a pointer or possibly the human finger as associated with a display device such as a cathode ray tube (CRT).

It is highly desirable to be able to automatically locate the pointer reference on a CRT for a man-machine interface. There are various existing techniques described for carrying this out. These techniques include special forms of tablets, many of which employ resistive or capacitive forms of sensing. The various techniques that are described in the literature use technology that is quite cumbersome. Furthermore, the systems are subject to wear and generally have resolution limitations.

Accordingly, it is an object of the present invention to provide an approved touch screen input system which provides an extremely simple form of interface with the display and any associated computer.

Another object of the present invention is to provide an improved touch screen input system which employs a minimum number of components and yet provides good detection resolution.

Still a further object of the present invention is to provide an improved touch screen input system that is not subject to deterioration with normal use.

Still another object of the present invention is to provide a touch screen input system in which there is no requirement for any special purpose pen or pointer. In accordance with the invention, even a standard graphite pencil may be used as a pointer.

SUMMARY OF THE INVENTION

To accomplish the foregoing and other objects, features and advantages of the invention, there is provided a touch screen input system for use with a display screen having a photo-active display surface including a controllable sweeping beam. In accordance with the invention, a preferred display is a CRT display which employs the standard type of raster scan. In accordance with the invention there is at least one photo-detector means and means for mounting this photo-detector means adjacent the photo-active display surface, but in non-interfering view of the photo-active display surface. The photo-detector means is adapted for placement so as to receive light from the region immediately adjacent the display surface. A pointer means is provided which may actually be the operator's finger, or some type of selection pen. This is adapted to reflect light from the beam to the photo-detector means so as to provide a latch signal. The detection circuitry includes means for continuously registering the position of the beam in the display surface, which circuitry is responsive to the latch signal, and means for continuously registering, for holding, a signal that, identifies the display screen location corresponding to the pointer means location. In accordance with the preferred embodiment of the invention, rather than a single photo-detector means, there are preferably provided, multiple photo-cells, such as four photo-cells, one at each corner of the CRT display directed all converging toward the CRT display. The photo-detectors are preferably connected in parallel to the input of a high-gain AC-coupled amplifier. Also, in accordance with the preferred embodiment of the invention, the means for continuously registering position may comprise a set of counters which have counts coincidental with the X and Y locations of the beam on the CRT. At the moment of detecting an impulse of light from the pointer means, the output values of the counters are held, with the X and Y coordinates thereof indicative of pointer means position on the display surface.

Also, in accordance with the present invention, there is provided a method of detection of a pointer means location on a display screen such as a CRT screen. This method comprises the steps of providing photo detection means adapted to detect the reflection of light from the pointer means, providing a continuous registration of location of the sweeping beam on the CRT surface and, upon detection of the light impulse at the photo-detector, holding the registered values corresponding to pointer means location.

BRIEF DESCRIPTION OF THE DRAWINGS

Numerous other objects, features and advantages of the invention should now become apparent upon a reading of the following detailed description taken in conjunction with the accompanying drawing, in which:

FIG. 1 illustrates a CRT display with associated scan line signal;

FIG. 2 illustrates the CRT display also and the associated placement of the photo-detectors;

FIG. 3 is a perspective view of a photo-cell or photo-detector as used in FIG. 2;

FIG. 4 is a side elevation view showing the placement of the photo-cell relative to the CRT surface and also illustrating the selection pen;

DETAILED DESCRIPTION

Figure 5:
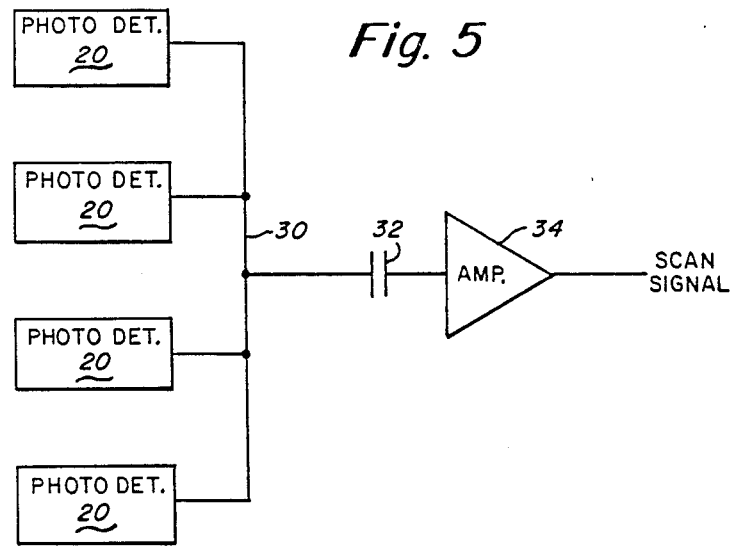
FIG. 5 is a block diagram of a part of the detection circuit of the present invention including the multiple photo-detectors and amplifier.

The system of the present invention as illustrated in FIGS. 1-6 describes a new technique for detecting the location of an object such as a pointer, selection pen, or even a finger of the human hand on a display screen such as a cathode ray tube (CRT) display.

A finger or any other object, preferably a light colored object, such as a selection pen, when touched to a CRT display surface, is illuminated by that portion of the screen that is excited by the beam as it travels past. In a raster display, the beam traces a distinctive pattern from the top to the bottom of the screen, sweeping all of the screen area. The beam is typically intensity-modulated to produce different characters or images on the screen. Now, if the finger or selection pen is placed on top of or adjacent to the characters or images, a portion of the tip of the finger or of the selection pen is illuminated whenever the beam excites those characters or images. In accordance with the invention, the illumination is detected by one or more photo-detectors on the edges of the screen. Preferably there are provided multiple detectors that ensure that every part of the screen area is seen by one or more detectors. Typically, as illustrated in the drawings, four such photo-detectors are used, one at each corner of the screen.

Now, FIG. 1 simply illustrates a cathode ray tube 10 with its display screen or face 12. On the tube face, there are illustrated a series of scan lines 14 and also illustrated in FIG. 1 is a scan signal 16. The segment of the line 14 illustrated in FIG. 1 corresponds to the length of the pulse illustrated in connection with the scan line signal 16. As indicated previously, in a standard CRT display, the sweeping electron beam operates on the basis of a raster scan in which horizontal sweeps occur at a predetermined rate. When a horizontal sweep is completed, then the beam retraces and commences again with a subsequent horizontal sweep at a slightly lower vertical position. This horizontal sweeping action continues until the entire screen has been swept.

Reference is now made to FIG. 2 which also illustrates the CRT screen 12 and illustrates the further principle in accordance with the present invention of employing photo-cells. In FIG. 2 there are shown four photo-cells 20, each properly supported at a corner of the screen. FIG. 3 shows a simple perspective view of one of the photo-cells 20. FIG. 4 illustrates a bezel support 22 which is used to support each of the photo-cells at a corner of the CRT screen 12. Various types of support may be provided for the photo-cell. The photo-cell 20 is to be arranged so that its viewing area 21 is directed toward the center of the CRT screen and so that its field of view is substantially 90°. In the actual version of the photocell shown in FIG. 3, there is found a photocell, plastic support housing and photocell lens.

Now, with regard to FIG. 2 it is noted that there are illustrated on the face of the screen, a series of dots 24 which may represent points on the screen that are to be selected by the selection pen 26. One of the desirable features of the present invention is that the pen 26 need not be of any special design. No wires are coupled from the pen. The pen is used only for the purpose of providing a reflecting surface so that light at the dot 24A in FIG. 2 is reflected by the selection pen 26 in the direction of the dotted lines 25 illustrated in FIG. 2. These dotted lines 25 simply illustrate a direction of light as it is reflected toward each of the photo-cells 20. As indicated previously, a plurality of photo-cells are preferably used to ensure that the field of view is not totally blocked and that the entire screen is covered. However, it is understood that the principles of the invention are applied in a most simplified version in connection with the use of only a single photo-cell.

It is to be understood in connection with FIGS. 2-4 that the light that progresses along the paths 25 occurs only at the predetermined point in the raster scan where the dot 24A is illuminated. Now, to the human eye, the dot 242A appears to be always illuminated, but in actuality, it is illuminated at a fast repetition rate and during a single complete screen scan. It is illuminated only when the beam is at the X and Y coordinate corresponding to the dot 24A position. It is furthermore stated that although multiple photo-cells are employed, it is understood that the detection signal should be received at each of the photo-cells during the time when the image is illuminated by the beam.

Now, reference is made to FIG. 5 which shows the four photo-cells 20 illustrated in block form in FIG. 5. All of these photo-cells are connected in parallel to the common line 30 and from there by way of AC-coupling capacitor 32 to the high gain amplifier 34. The output of the amplifier 34 is referred to as the scan signal, also referred to hereinafter in connection with the circuitry of FIG. 6. The purpose of the amplifier 34 is to amplify the signal from the photo-detectors. The signal from the photo-detectors is typically a few milli-volts and the amplifier 34 amplifies the signal to a digital logic level, typically say, 5 volts for the "on" condition.

The purpose of the AC coupling by means of the illustrated capacitor 32 is to reject ambient stray light and to take advantage of the fact that the beam is scanning across the CRT at a known frequency, and therefore, the response of the amplifier can be matched to optimize the signal with respect to noise. Amplifier 34 may also provide other signal processing operations, such as signal clipping, pulse shaping and threshold detection.

Figure 6:
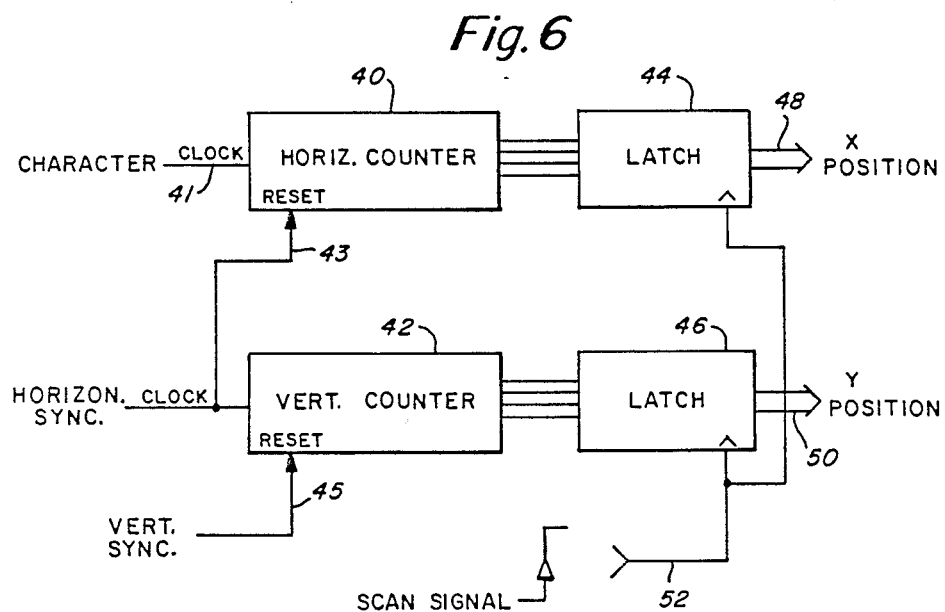
FIG. 6 is a block diagram illustrating the remainder of the detection circuitry for providing X and Y position locations of the selection pen.

Reference is now made to FIG. 6 which shows the counting circuitry associated with the CRT display. In FIG. 6 there is shown a horizontal counter 40 and a vertical counter 42. Associated with the horizontal counter 40 is a data latch 44. Similarly, associated with the vertical counter 42 is a data latch 46. At the output of the latch 44 there is shown an output line 48 that gives the X position on the CRT screen. There is also associated with the latch 46, an output at 50 which gives the Y position of the CRT screen. It is also noted that there is an input to each of these data latches emanating from the line 52. This is the scan signal and is the output taken from the amplifier 34 illustrated in FIG. 5.

With regard to the diagram of FIG. 6 it is noted that the horizontal counter 40 has a clock input at 41 and a reset input at line 43. This clock signals at line 41 is the horizontal character clock signal that provides increments of the horizontal scan, on a character basis with the output of the counter 40 being a binary signal representative of the particular horizontal position along a particular scan line. This allows you to be synchronized with the characters selected by the pointer means. The output of the counter 40 is continuously fed to the latch 44, but the latch 44 operates to latch a particular count only when the signal on line 52 occurs. The signal on line 52 is a detection signal that comes from the photo-detectors as illustrated in FIG. 5.

As indicated in FIG. 6, the horizontal sync signal couples by way of line 43 for resetting the horizontal counter. This signal also couples as a clock input to the vertical counter 42. The vertical counter 42 is reset from the vertical sync signal coupled to the vertical counter at line 45. As with the horizontal counter, the vertical counter 42 also couples to the data latch 46 and the output signals from the vertical counter 42 are binary signals representative of one of the particular scan lines that is presently being scanned by the beam. The latch 46 continuously receives the binary output from the vertical counter, but an output is latched at line 50 only when the detection occurs by way of the signal on line 52 to the data latch.

Thus, the pair of counters shown in FIG. 6 have at any one period of time, corresponding binary signals associated therewith that correspond with X and Y locations on the CRT screen. Now, when the photo-detectors detect a signal, this scan signal causes the particular X and Y location signals to be latched in the respective data latches 44 and 46. At the moment of detecting an impulse of light, the output values of the counters are thus essentially frozen. In this connection, there may be associated with the circuit of FIG. 6 an associated computer that would control the resetting of the latches 44 and 46. The software in the computer would use the X and Y locations in conjunction with other internal software logic to interpret the commands that are input by a user pointing to certain symbols or words on the CRT display. In this connection, refer again to the particular symbol 24A in FIG. 2 that has been pointed to by the selection pen 26.

Thus, as the beam scans the CRT screen in the usual raster scan form, synchronous with this scanning are the horizontal and vertical counters that give output signal representating the position of the beam at any point in time in its transit. Now, when the raster scan reaches the point 24A in FIG. 2 where the selection pen 26 is located, it is at that point that the photo-cells provide a detection signal and it is only at that point that the latches 44 and 46 are latched so as to retain the horizontal and vertical counts. These horizontal and vertical counts correspond to the position on the CRT screen at which the dot or point 24A is located. Therefore, there is provided in accordance with the present invention, a relatively simple and effective means by which dot or point selection can be readily determined in connection with particular characters or images on a display screen that are to be selected by a pointer means or the like.

It will be understood that at a plurality of points in an image of finite size the conditions for latching the counters may exist. The first such point to deliver sufficient light to trigger the latches will do so, thus giving to the computer as input a single position indication that falls within the area of the illuminated image.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A touch screen input system for use with a display screen having a photo-active display surface including a controllable sweeping beam, said system comprising: at least one photo-detector means, means for mounting the photo-detector means adjacent the photo-active display surface but in non-interfering view of the photo-active display surface, in combination with detection means comprising means for continuously registering the position of the beam in the display surface including counter means, pointer means adapted to reflect light directly from the beam to said photo-detector means, a latch means coupled from said counter means and having a latching input, and means coupling from said photo-detector means to said latch input and responsive to an AC-coupled signal transition from said photo-detector means to activate said latch means and thereby hold a signal identifying display screen location corresponding to pointer means location.

2. A touch screen input system as set forth in claim 1 comprising a plurality of photo-detector means.

3. A touch screen input system as set forth in claim 1 wherein said display screen comprises a CRT having a raster beam scan and wherein said photo-detector means comprises a plurality of separately mounted photo-cells.

4. A touch screen input system as set forth in claim 3 wherein there are provided four photo-cells, one at each corner of the CRT.

5. A touch screen input system as set forth in claim 1 wherein said counter means comprises a horizontal counter means and a vertical counter means.

6. A touch screen input system as set forth in claim 5 wherein said latch means includes a data latch associated with each respective counter.

7. A touch screen input system as set forth in claim 1 wherein said pointer means comprises a selection pen.

8. A method of detecting the position of a pointer means on a display screen having a photo-active display surface including a controllable sweeping beam, said system comprising the steps of photo-electrically detecting reflected light from the beam directly reflected from the pointer means by means of impulse detection of light, continuously registering the position of the beam in the display surface, and holding a signal identifying display screen location corresponding to pointer means location upon such impulse detection of said photo-electric signal.

9. A touch screen input system for use with a display screen having a photo-active display surface including a controllable continuously sweeping raster scan beam, said system comprising; at least one photo-detector means disposed adjacent the photo-active display surface, in combination with detection means and pointer means, said pointer means adapted to reflect light directly from the continuous raster scan beam to said photo-detector means to provide a latch signal, said detection means including registering means responsive to said latch signal for providing a position signal identifying display screen location corresponding to pointer means location, said latch signal being provided by means including an amplifier means and means for AC coupling the amplifier means between the photo-detector means and the registering means.

10. A touch screen input system as set forth in claim 1 wherein the means coupling from said photo-detector means to said latch input includes an amplifier means.

11. A touch screen input system as set forth in claim 10 including means for AC coupling the amplifier means between the photo-detector means and the latch input.

12. A touch screen input system as set forth in claim 11 wherein said means for AC coupling includes a capacitor coupled from said photo-detector means to said amplifier means.

13. A touch screen input system as set forth in claim 12 including a plurality of photo-detector means and means coupling said plurality of photo-detector means in common via said capacitor to said amplifier means.

14. A touch screen input system as set forth in claim 1 wherein said AC coupling is provided by capacitor means.

15. A touch screen input system as set forth in claim 14 wherein said counter means includes a horizontal counter and a vertical counter, said latch means including a horizontal latch and a vertical latch, means for coupling the output of the horizontal counter to the horizontal latch, means for coupling the output of the vertical counter to the vertical latch, both said latches being latched by said latch signal to hold the counter data.

16. A touch screen input system as set forth in claim 15 wherein said display screen comprises a CRT having a raster beam scan and wherein said photo-detector means comprises a plurality of separately mounted photo-cells.

17. A touch screen input system as set forth in claim 16 including means for coupling said photo-cells in common to said capacitor means.

18. A method as set forth in claim 8 wherein the impulse detection is carried out by AC coupling the signal reflected from the pointer means.

19. A touch screen input system as set forth in claim 9 wherein said means for AC coupling includes a capacitor coupled from said photo-detector means to said amplifier means.

20. A touch screen input system as set forth in claim 19 including a plurality of photo-detector means and means coupling said plurality of photo-detector means in common via said capacitor to said amplifier means.

21. A touch screen input system as set forth in claim 9 wherein said registering means includes a horizontal counter and a vertical counter, and a horizontal latch and a vertical latch, means for coupling the output of the horizontal counter to the horizontal latch, means for coupling the output of the vertical counter to the vertical latch, both said latches being latched by said latch signal to hold the counter data.

22. A touch screen input system as set forth in claim 21 wherein said display screen comprises a CRT having a raster beam scan and wherein said photo-detector means comprises a plurality of separately mounted photo-cells.

23. A touch screen input system as set forth in claim 22 including means for coupling said photo-cells in common to said capacitor means.

24. A touch screen input system as set forth in claim 9 wherein said photodetector means is disposed outside of the bounds of said photo-active display surface and substantially in a plane defined by a photo-active display surface.

25. A touch screen input system for use with a display screen having a photo-active display surface including a controllable sweeping beam, said system comprising; at least one photo-detector means disposed adjacent the photo-active display surface, in combination with detection means and pointer means, said pointer means adapted to reflect light directly from the beam to said photo-detector means to provide a latch signal, said detection means including registering means responsive to said latch signal for providing a position signal identifying display screen location corresponding to pointer means location, said photo-detector means being disposed outside of the bounds of said photo-active display surface and substantially in a plane defined by the photo-active display surface.

26. A touch screen input system as set forth in claim 25 wherein said display screen is a CRT screen having a controllable continuously sweeping raster scan beam with the pointer means adapted to reflect light directly from the raster scan beam to the photodetector means.

27. A touch screen input system as set forth in claim 26 wherein said latch signal is provided by means including an amplifier means and means AC coupling the amplifier means between the photodetector means and the registering means.

28. A touch screen input system as set forth in claim 26 wherein said latch signal is provided by means including differentiator means for providing for the impulse detection of light.

29. A method of detecting a position of a pointer means on a display screen having a photo-active display surface including a controllable continuously sweeping raster scan beam, said system comprising the steps of providing a photoelectric detecting means, disposing the photoelectric detecting means outside of the bounds of said photo-active display surface and substantially in a plane defined by the photoactive display surface, photo-electrically detecting reflected light from the beam directly reflected from the pointer means, continuously registering the position of the beam in the display surface, and holding a signal identifying display screen location corresponding to pointer means location upon impulse detection of said photoelectric signal.

* * * * *